March 26, 1940.                B. S. AIKMAN                2,194,732
                             BRAKE CYLINDER DEVICE
                          Original Filed Sept. 11, 1937
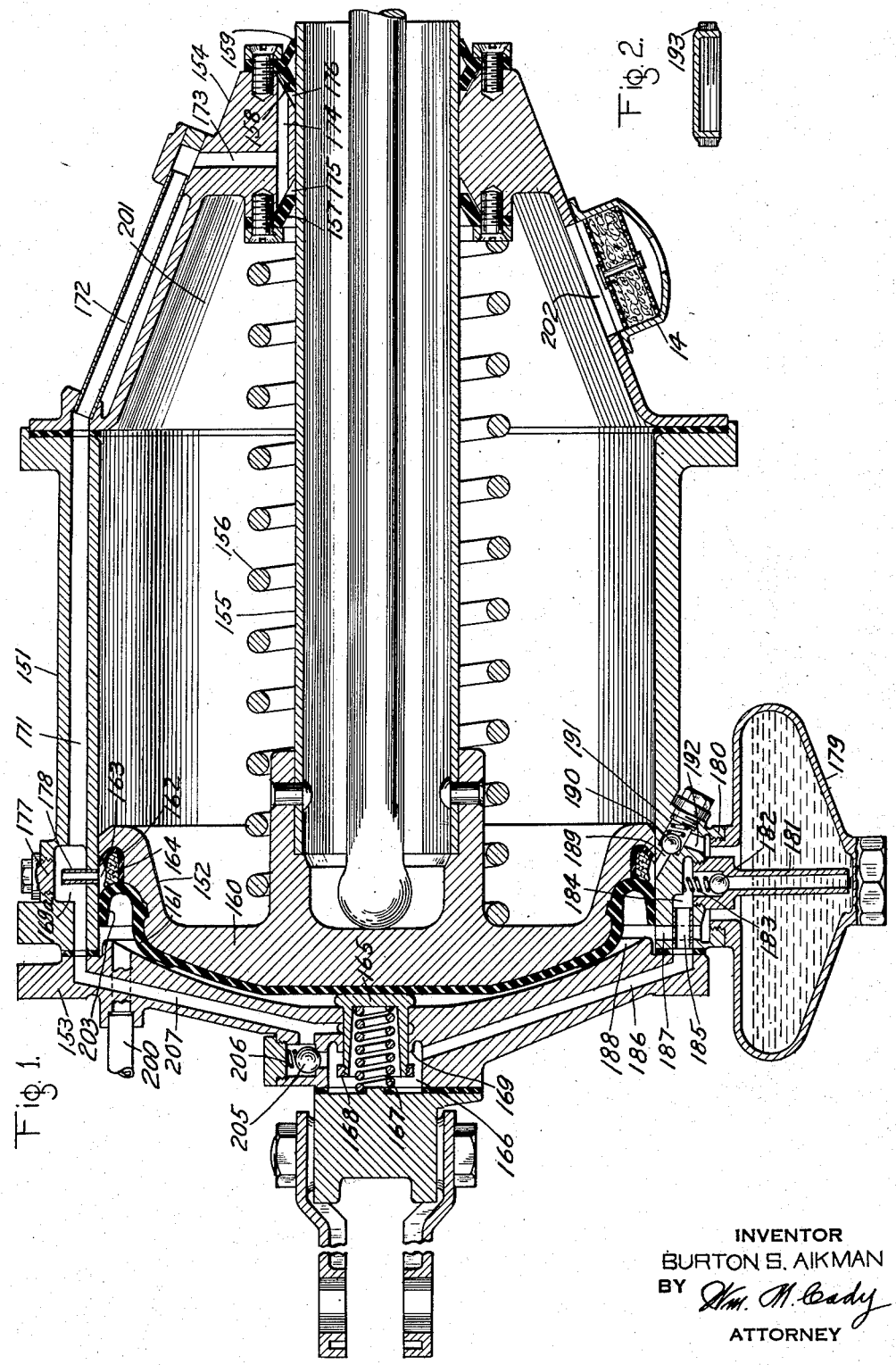
INVENTOR
BURTON S. AIKMAN
BY *Wm. M. Cady*
ATTORNEY Patented Mar. 26, 1940

2,194,732

UNITED STATES PATENT OFFICE 2,194,732

BRAKE CYLINDER DEVICE

Burton S. Aikman, Wilkinsburg, Pa., assignor to The Westinghouse Air Brake Company, Wilmerding, Pa., a corporation of Pennsylvania Original application September 11, 1937, Serial No. 163,390. Divided and this application April 14, 1938, Serial No. 202,141

11 Claims. (Cl. 184—18)

This invention relates to fluid pressure brake equipment and more particularly to brake cylinder devices which form a part thereof and which are operative by fluid under pressure for effecting an application of the brakes, this application being a division of my copending application, Serial No. 163,390, filed September 11, 1937.

The usual brake cylinder device comprises a single acting piston slidably mounted in a cylinder body, and a push rod carried by the piston and slidably mounted in a non-pressure head secured to one end of the body. In order to prevent excessive wear of these parts of a brake cylinder device and maintain such parts in condition to work freely, and also to maintain the fit between the piston and cylinder as leak tight as possible, it is desirable to maintain these parts adequately lubricated.

The principal object of the invention is therefore to provide an improved, automatic lubricating system for the working parts of a brake cylinder device.

Other objects and advantages will be apparent from the following more detailed description of the invention.

In the accompanying drawing: Fig. 1 is a sectional view of a brake cylinder device embodying the improved lubricating system; and Fig. 2 is a sectional view of a cap adapted to be employed in connection with a portion of the apparatus shown in Fig. 1.

As shown in the drawing, the improved brake cylinder device comprises a cylindrical body 151 having a bore in which there is disposed a brake cylinder piston 152, the bore at one end being closed by a pressure head 153 and at the opposite end by a non-pressure head 154. The piston 152 has at one side a pressure chamber 188 connected to a pipe 200 through which fluid under pressure is adapted to be supplied to said chamber for effecting an application of the brakes and through which fluid under pressure is adapted to be released from said chamber for effecting a release of the brakes, in the usual manner. The piston 152 has at the opposite side a non-pressure chamber 201 open to the atmosphere through a breather passage 202 over which a strainer 14 is provided for preventing dirt or other foreign matter entering said chamber.

The piston 152 has a hollow rod 155 secured to the low pressure face thereof and said rod is slidably mounted in a suitable bore provided through the end of the non-pressure head 154. A return spring 156 is interposed between the low pressure face of the piston 152 and the non-pressure head 154 for urging the piston 152 to its release position, as shown in the drawing.

A packing cup is secured to the inside of the non-pressure head 154 and has an outwardly flared skirt portion 157 in sealing engagement with the periphery of the piston rod 155 while to the outer end of the non-pressure head 154 there is secured a packing cup having an inwardly flared skirt portion 158 effecting sealing engagement with the periphery of the piston rod 155 and an oppositely flared skirt portion 159 also effecting sealing engagement with said rod. The skirt portion 159 is provided to prevent the entrance of foreign matter between the skirt 158 and the piston rod 155 which would tend to force the skirt 158 out of sealing engagement with the rod 155 and thereby permit leakage past the skirt 158. It will be noted that the skirts 157 and 158 of the two packing cups are oppositely disposed so as to prevent leakage from between said cups out along the piston rod 155.

The piston 152 comprises a piston head 160 to which is secured a suitable packing cup 161 having an outwardly flaring skirt portion 203 slidably contacting the wall of the cylinder. Back of the skirt portion 203 an annular groove is provided in the peripheral face of the piston and in this groove is an annular packing 162 which is substantially L-shaped in cross-section and so disposed that one leg portion of the packing flares outwardly into sealing engagement with the wall of the piston cylinder. Between this leg portion of packing 162 and the adjacent portion of the piston packing 161 there is an annular space 163 in which there is disposed any suitable lubricant absorbing material 164, such for example as in the form of a felt ring.

A lubricant pump piston 165 is slidably mounted in a suitable bore in the pressure head 153 in axial alignment with the brake cylinder piston 152. One side of this pump piston is subject to pressure in chamber 188 at the pressure side of the brake cylinder piston 160, while the opposite side is open to a chamber 166 in which there is disposed a spring 167 which acts on the pump piston urging same in the direction toward the application position of the brake cylinder piston 152. An annular collar 168 is provided on the end of the piston 165 in chamber 166 and is adapted to engage a shoulder 169 provided on the pressure head for limiting outward movement of the piston 165, which will be hereinafter described.

The chamber 166 is open past a discharge valve 205, which is subject to the pressure of a light bias spring 206, to a passage 207 which extends upwardly through the pressure head 153 to a point where it is connected to a passage 171 extending lengthwise through the top of the brake cylinder body 151. The passage 171 is connected through a pipe 172 secured in suitable bosses provided on the non-pressure head 154 to a passage 173 in the non-pressure head which leads to a passage 174 therein. One end of the passage 174 leads to the pressure face of the packing cup skirt 157 and to an annular groove 175 open to and surrounding the outer periphery of the piston rod 155, while the other end of the passage 174 opens to the pressure face of the packing cup skirt 158 and to an annular passage 176 open to and surrounding the outer periphery of said piston rod.

A chamber 169a provided above and open to passage 171 is provided with an opening, normally closed by a plug 177, for the insertion of a stand pipe 178 into the brake cylinder body 151 for establishing communication from said chamber to the annular chamber 163 in the brake cylinder piston 152, when said piston is in release position, as shown in the drawing. This pipe extends somewhat above the level of the top wall of the passage 171 for reasons which will be hereinafter explained.

A removable lubricant reservoir 179 is secured to a depending boss 180 on the brake cylinder body 151 by screw-threaded engagement. A suction pipe 181 secured to the brake cylinder body 151 within the boss 180 extends to near the bottom of the reservoir 179. In the upper end of this pipe there is disposed an inlet check valve 182 and a light spring 183 acting on said check valve for seating same. The space 184 above the check valve 182 is connected through a pipe 185 to a passage 186 which leads to the pump piston chamber 166.

A passage 187 is provided in the lowermost portion of the brake cylinder body 151 leading from the pressure chamber 188 in front of the brake cylinder piston 160 to the lubricant reservoir 179. The brake cylinder body 151 is also provided with a port 189 in its lowermost portion adapted to connect to the chamber 163 in the brake cylinder piston when said piston is in its release position, as shown in the drawing. A check valve 190, subject to the pressure of a spring 191, is provided in the brake cylinder body for controlling communication from passage 189 to a passage 192 which is also open to the lubricant reservoir 179.

The operation of the brake cylinder device just described is as follows: Whenever the brake cylinder piston 152 is moved in a direction toward the right hand by fluid under pressure supplied through pipe 200 to the chamber 188, in order to effect an application of the brakes, the spring 167 moves the pump piston 165 in the same direction until the collar 168 thereon engages the shoulder 169 in the casing. During this movement of the pump piston 165, it draws lubricant from the reservoir 179 up through the intake pipe 181 and past the check valve 182 into passage 186 and chamber 166 at the left hand side thereof. At the end of this intake stroke of the pump piston 165 the pressure of spring 183 acts to seat the inlet valve 182.

When the brake cylinder piston 152 is then returned toward its release position upon the release of fluid under pressure from chamber 188 through pipe 200 in effecting a release of the brakes, said piston engages the pump piston 165 and forces said piston into chamber 166 to the position shown in the drawing and this movement of the pump piston acts to force lubricant out of chamber 166 past the check valve 205 into passage 207 and from thence to passage 171 and chamber 169a in the brake cylinder body 151. From passage 171 the lubricant is forced to pipe 172 in the non-pressure head 154 and from thence through passages 173 and 174 to the annular spaces 175 and 176 wherein the lubricant contacts the piston rod 155 so as to effect lubrication thereof as said rod is moved through the non-pressure head 154 upon operation of the brake cylinder piston 152. The packing cup skirts 157 and 158 act to prevent leakage of lubricant supplied to the annular grooves 175 and 176 out along the piston rod 175.

After the lubricant passages just described are filled with lubricant, the lubricant rises above passage 171 in chamber 169a to above the top of the pipe 178 and then flows down through said pipe into the annular chamber 163 and around the brake cylinder piston 152, so that upon movement of the brake cylinder piston, lubricant in said chamber will be spread upon the wall of the brake cylinder body. The felt ring 164 is provided to absorb and hold a portion of the lubricant supplied to chamber 163 for providing a more uniform application of the lubricant to the cylinder wall.

It will here be noted that the pump piston 165 is operated upon its intake stroke when the brake cylinder piston 152 moves toward the right hand in applying the brakes and is operated on its pumping stroke by said piston during the final movement of said piston to release position, and it will further be noted that the skirt 203 of packing cup 161 covers the lower end of pipe 178 before said pump piston is operated to pump lubricant and thus prevents the pumping of lubricant into chamber 188 at the pressure side of the piston. In other words, the pump piston 165 is not operated to pump lubricant until after the annular chamber 163 in the brake cylinder piston is substantially open to the outlet end of stand pipe 178.

The pipe 178 is provided in chamber 169a in order to prevent lubricant contained therein and in the passage 171 from draining into the pressure chamber 188 when the lower end of said pipe is open thereto at the time the brake cylinder piston 152 is in its application position at the right hand side of the lower end of said pipe.

The passage 187 is provided in the lower portion of the brake cylinder body 151 to permit any lubricant which may collect in the pressure chamber 188 at the left hand side of the packing cup 161 to drain back into the lubricating reservoir 179. The passage 187 also has another function in that it permits the fluid pressure obtained in the pressure chamber 188 in effecting an application of the brakes to act on the body of lubricant in the reservoir 179 and thereby through the pipe 181 and passage 186 on the lubricant in the pump piston chamber 166, thereby balancing substantially the opposing fluid pressures acting on the pump piston 165 in order to facilitate movement thereof by the spring 167 on its suction stroke.

After the lubricant conducting passages in the brake cylinder device are completely filled with lubricant, the displacement of the lubricating pump 165 is sufficient to replenish any lubricant used therefrom since the previous release of brakes and then build up a sufficient lubricant pressure through the stand pipe 178 and annular chamber 163 on the check valve 190 to unseat same against the pressure of spring 191 and force a certain amount of lubricant through the chamber 163 around the periphery of the brake cylinder piston 152 and back to the lubricant reservoir 179. In other words, it is intended that the pump piston 165 shall upon each pumping stroke circulate some lubricant around the brake cylinder piston 152 and back into the lubricant reservoir 179, so as to provide the most efficient type of lubrication for the brake cylinder piston.

The lubricant reservoir 179 is, as hereinbefore described, secured to the depending boss 180 of the brake cylinder body 151 so that after the lubricant in said reservoir has been used up, the reservoir may be removed through the medium of a wrench (not shown) adapted to be applied to the lower end thereof. After the reservoir 179 is removed a cap 193, shown in Fig. 2 of the drawing, is adapted to be secured over the open end thereof by screw-threaded engagement, for preventing dirt or other foreign matter from entering the interior of said reservoir. A cap 193 is then removed from another reservoir 179, which has been filled with lubricant, and this reservoir is then screwed into the depending boss 180 of the brake cylinder device and provides lubricant for further operation thereof. It is, of course, evident that the empty reservoir 179 removed from the brake cylinder could be refilled with lubricant at the time of removal and then reapplied to the brake cylinder if desired, but it is proposed that in actual practice several reservoirs 179, properly filled with lubricant, will be carried by a workman and applied to brake cylinder devices as required to replace empty reservoirs. A cap 193 is provided on each of the filled reservoirs 179 not only to prevent dirt entering the reservoirs, but also to hold the lubricant in the reservoirs.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. A brake cylinder device comprising in combination, a casing, a piston slidably mounted in said casing, a piston rod carried by said piston and slidably mounted in said casing, said piston having a release position and being movable therefrom to effect an application of the brakes, said piston also having an annular lubricant receiving space disposed at the peripheral face thereof, a lubricant conducting passage in said casing adapted to communicate with said space in the release position of said piston, another lubricant conducting passage leading to the peripheral bearing of said rod in said casing, a source of lubricant, and a pump means operable upon movement of said piston from release position to effect the supply of lubricant from said source to a chamber and operable upon movement of said piston to release position to force lubricant from said chamber into and through said passages to said space and the bearing of said rod in said casing.

2. A brake cylinder device comprising in combination, a casing, a piston slidably mounted in said casing and having at one side a non-pressure chamber and at the opposite side a pressure chamber to which fluid under pressure is adapted to be supplied for effecting movement of said piston in one direction to effect an application of brakes and from which fluid under pressure is adapted to be vented to permit movement of said piston in the opposite direction to effect a release of brakes, a source of lubricant adapted to be subjected to the pressure of fluid in said pressure chamber, a pump piston subject to the opposing fluid pressures in said pressure chamber and source of lubricant, a spring acting on said pump piston for operating same to effect the suply of lubricant from said source to a chamber upon movement of said brake cylinder piston in the direction to apply the brakes, said pump piston being movable by said brake cylinder piston upon movement in the direction for releasing the brakes to operate said pump piston to force lubricant from said chamber to the moving parts of said device.

3. A brake cylinder device comprising in combination, a casing, a piston slidably mounted in said casing and having a release position and movable therefrom by fluid under pressure to effect an application of brakes, a lubricant reservoir carrying a quantity of lubricant removably secured to said casing, said casing having passages for conducting lubricant to the moving parts of said device, means operative upon movement of said piston in one direction to effect a supply of lubricant from said reservoir to a chamber and upon movement of said piston in the opposite direction to force the lubricant under pressure from said chamber into said passages; and means operative upon a predetermined increase in the pressure of lubricant forced into said passages to open communication therefrom to said reservoir to permit release of lubricant back to said reservoir.

4. A brake cylinder device comprising in combination, a casing, a piston slidably mounted in said casing and having at one side a pressure chamber to which fluid under pressure is adapted to be supplied to effect movement of said piston to apply brakes and from which fluid under pressure is adapted to be released to permit movement of said piston to effect a release of brakes, a reservoir carrying a quantity of lubricant secured to said casing with the space above the lubricant open to said pressure chamber at the lowermost portion thereof, and means operative upon movement of said piston in applying the brakes to effect charging of a chamber with lubricant from said reservoir and in releasing the brakes to force the lubricant from said chamber to the moving parts of said device for effecting lubrication thereof.

5. A brake cylinder device comprising in combination, a casing, a piston slidably mounted in said casing and having a release position and movable therefrom by fluid under pressure to effect an application of brakes, said piston having an annular lubricant carrying chamber at the peripheral face thereof, said casing having a port communicating with said chamber in the release position of said piston, said casing also having a passage connected to said port, a source of lubricant, means operative upon movement of said piston in a direction away from release position to effect charging of a chamber with lubricant from said source and upon movement in the opposite direction into release position to force lubricant from said chamber to said passage, and a check valve for preventing flow of lubricant through said port in a direction toward said passage.

6. A brake cylinder device comprising in combination, a casing, a piston slidably mounted in said casing and having a release position and movable therefrom by fluid under pressure to effect an application of brakes, said casing having passages for conveying lubricant to the moving parts of said device, means for preventing leakage of lubricant at the moving parts of said device, means operative upon movement of said piston to supply lubricant under pressure to said passages, and means operative upon a predetermined increase in the pressure of lubricant in said passages to release lubricant therefrom.

7. A brake cylinder device comprising in combination, a casing, a piston slidably mounted in said casing and having a release position and movable therefrom by fluid under pressure to effect an application of brakes, a rod secured to said piston and slidably mounted in a bore in said casing, said piston having an annular lubricant receiving chamber at the peripheral face thereof, said casing having a passage through which lubricant is adapted to be supplied to the bearing of said rod, said casing also having a port communicating with said passage and in release position of said piston with said chamber, means operative upon movement of said piston for supplying lubricant under pressure to said passage, and means for preventing the supply of lubricant through said port until said passage is substantially charged with lubricant.

8. A brake cylinder device comprising in combination, a casing, a piston slidably mounted in said casing and having a release position and movable therefrom by fluid under pressure to effect an application of brakes, a rod secured to said piston and slidably mounted in a bore in said casing, said piston having an annular lubricant receiving chamber at the peripheral face thereof, said casing having a passage through which lubricant is adapted to be supplied to the bearing of said rod, said casing also having a port communicating with said passage and in release position of said piston with said chamber, means operative upon movement of said piston for supplying lubricant under pressure to said passage, the inlet opening of said port to said passage being so positioned that lubricant is prevented from flowing through said port until said passage is substantially filled with lubricant.

9. A brake cylinder device comprising in combination, a cylinder, a pressure head secured to one end of said cylinder, a non-pressure head secured to the opposite end of said cylinder, a brake cylinder piston slidably mounted in said cylinder, a rod carried by said piston and slidably mounted in a bore through said non-pressure head, a reservoir containing a quantity of lubricant removably connected to said device, a pump piston slidably mounted in said pressure head and operable to supply lubricant from said reservoir through an intake passage to a chamber and from said chamber through a discharge passage for lubricating said device, a check valve for preventing back flow through said intake passage, a check valve for preventing back flow through said discharge passage, and means for effecting operation of said pump piston upon movement of said brake cylinder piston from release position and the subsequent movement of said brake cylinder piston back to release position.

10. A brake cylinder device comprising in combination, a casing, a piston slidably mounted in said casing and having at one side a pressure chamber to which fluid under pressure is adapted to be supplied to effect movement of said piston to apply brakes and from which fluid under pressure is adapted to be released to permit movement of said piston to effect a release of brakes, a reservoir carrying a quantity of lubricant secured to said casing with the space above the lubricant open to said pressure chamber, and means operative upon movement of said piston in applying the brakes to effect charging of a chamber with lubricant from said reservoir and in releasing the brakes to force the lubricant from said chamber to the moving parts of said device for effecting lubrication thereof.

11. A brake cylinder device comprising in combination, a casing having a bore, a piston slidably mounted in said bore and having a release position and movable therefrom by fluid under pressure to effect an application of the brakes, a reservoir containing a quantity of lubricant associated with said casing and open to the lowermost portion of said bore at the pressure side of said piston in its release position, said piston having an annular groove in the peripheral face thereof and one side of said groove being open to the wall of said bore, said casing having a passage connecting said groove to said reservoir in the release position of said piston, and a pump operative upon movement of said piston from release position to supply lubricant from said reservoir to said chamber, said pump being operative by said piston upon subsequent movement to release position to force lubricant from said chamber into said groove around said piston and from thence through said passage to said reservoir.

BURTON S. AIKMAN.